US010657717B2

United States Patent
Hollis et al.

(10) Patent No.: US 10,657,717 B2
(45) Date of Patent: May 19, 2020

(54) SIMULATOR WITH MULTIPLE RECONFIGURABLE THREE-DIMENSIONAL COCKPIT VIEWS RENDERED IN REAL-TIME

(71) Applicant: Lockheed Martin Corporation, Bethesda, MD (US)

(72) Inventors: Howell B. Hollis, Orlando, FL (US); Adam R. Breed, Orlando, FL (US); Robert C. McCarthy, Orlando, FL (US); Kevin D. Cartrette, Denver, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/956,157

(22) Filed: Apr. 18, 2018

(65) Prior Publication Data

US 2019/0325648 A1 Oct. 24, 2019

(51) Int. Cl.
*G06T 19/00* (2011.01)
*G09B 9/30* (2006.01)
(Continued)

(52) U.S. Cl.
CPC ............ *G06T 19/003* (2013.01); *G09B 9/302* (2013.01); *G09B 9/32* (2013.01); *G09B 19/165* (2013.01);
(Continued)

(58) Field of Classification Search
None
See application file for complete search history.

(56) References Cited

U.S. PATENT DOCUMENTS 6,018,350 A * 1/2000 Lee ........................ G06T 15/506
345/422
8,333,592 B2 12/2012 Swan
(Continued)

FOREIGN PATENT DOCUMENTS

WO 2015130360 A2 9/2015

OTHER PUBLICATIONS

Ernst et al.; "A concept for a virtual flight deck shown on an HMD;" Proc. SPIE 9839, Degraded Visual Environments: Enhanced, Synthetic, and External Vision Solutions 2016, 983909 (May 13, 2016), pp. 1-13 (Year: 2016).*
(Continued)

*Primary Examiner* — Edward Martello
(74) *Attorney, Agent, or Firm* — Withrow & Terranova, PLLC (57) ABSTRACT

A simulator is disclosed. A cockpit model comprising a plurality of cockpit model parts that collectively correspond to a simulated cockpit in a simulated vehicle is maintained. For each frame of a plurality of frames, a plurality of cockpit view frustums are determined, each cockpit view frustum corresponding to a different cockpit view of a plurality of cockpit views of the simulated cockpit. Shared cockpit scene information comprising a set of cockpit model parts that are within any of the plurality of cockpit views is generated based on the plurality of cockpit view frustums. A processing device submits to a graphics processing unit (GPU) the shared cockpit scene information and GPU instructions that direct the GPU to generate a plurality of cockpit view images that correspond to the plurality of cockpit views from the shared cockpit scene information. The GPU generates the plurality of cockpit view images.

20 Claims, 9 Drawing Sheets

(51) Int. Cl.
*G09B 9/32* (2006.01)
*G09B 9/12* (2006.01)
*G09B 19/16* (2006.01)

(52) U.S. Cl.
CPC ...... *G06T 2207/30268* (2013.01); *G09B 9/12* (2013.01)

(56) References Cited

U.S. PATENT DOCUMENTS

| | | | |
|---|---|---|---|
| 8,564,622 B1* | 10/2013 | Quinn | G06F 3/1438 345/632 |
| 2015/0111180 A1 | 4/2015 | Wheller et al. | |
| 2015/0178985 A1* | 6/2015 | Di Censo | G06T 17/05 345/419 |
| 2016/0093230 A1* | 3/2016 | Boggs | G09B 9/302 434/38 |
| 2017/0025031 A1* | 1/2017 | Dreyer | G09B 9/12 |
| 2017/0337717 A1 | 11/2017 | Kormandel et al. | |

OTHER PUBLICATIONS

Andreas Stefanidis; Simulation of Electronic Flight Instrument System of Boeing 787 aircraft; Proceedings of the 16th Central European Seminar on Computer Graphics, CESCG 2012, Apr. 29-May 1, 2012, Smolenice, Slovakia; 8 pages (Year: 2012).*
International Search Report and Written Opinion for International Patent Application No. PCT/US2019/027910, dated Aug. 12, 2019, 9 pages.

* cited by examiner

SIMULATOR WITH MULTIPLE RECONFIGURABLE THREE-DIMENSIONAL COCKPIT VIEWS RENDERED IN REAL-TIME

TECHNICAL FIELD

The embodiments relate generally to simulators, and in particular to a simulator with multiple reconfigurable three-dimensional cockpit views rendered in real-time.

BACKGROUND

Simulators are important for training drivers of moving vehicles, such as boats, planes, ships and spacecraft, and ground vehicles. Some vehicles, such as aircraft, have complicated cockpits with tens, hundreds, or even one thousand or more flight instruments and controls. Simulations often include both an out-the-window (OTW) display showing a realtime depiction of the environment outside the vehicle, and a cockpit area with flight instruments and controls. Increasingly, cockpits, like the simulated environment, are being simulated and presented as imagery on one or more displays. This allows a simulator to be easily converted from one type of vehicle to another type of vehicle by simply changing the simulation software.

SUMMARY

The embodiments provide a simulation system that implements multiple three-dimensional (3D) cockpit views. The embodiments generate realistic 3D cockpit imagery that include shadowing that changes depending on the orientation of the cockpit with respect to a light source, and flight controls with depth to create a more realistic and immersive training experience that more closely simulates the real-life cockpit being simulated.

In one embodiment a method is provided. The method includes maintaining, by a computing device comprising a processing device and at least one graphics processing unit (GPU), during a simulation, a cockpit model comprising a plurality of cockpit model parts that collectively correspond to a simulated cockpit in a simulated vehicle. The method further includes, for each frame of a plurality of frames, determining, by the processing device, a plurality of cockpit view frustums, each cockpit view frustum corresponding to a different cockpit view of a plurality of cockpit views of the simulated cockpit. The method further includes, for each frame of the plurality of frames, based on the plurality of cockpit view frustums, generating shared cockpit scene information comprising a set of cockpit model parts that are within any of the plurality of cockpit views. The method further includes, for each frame of the plurality of frames, submitting, by the processing device to the at least one GPU, the shared cockpit scene information and GPU instructions that direct the at least one GPU to generate a plurality of cockpit view images that correspond to the plurality of cockpit views from the shared cockpit scene information, and generating, by the at least one GPU, the plurality of cockpit view images.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first region" and "second region," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified.

Simulators are important for training drivers of moving vehicles, such as boats, planes, ships and spacecraft, and ground vehicles. The phrase "vehicle" as used herein will refer to any moving craft, including, by way of non-limiting example, aircraft, sea craft, spacecraft, and ground vehicles, which include one or more controls used by a driver of the vehicle to move the vehicle. The collection of controls used in a vehicle will be referred to herein as a cockpit. Some vehicles, including aircraft, have complicated cockpits with hundreds of flight instruments and controls. Simulations of aircraft often include both an out-the-window (OTW) display showing a real-time depiction of a simulated environment outside the vehicle, and a cockpit area with flight instruments and controls. Some simulators include actual physical simulated cockpits that have physical knobs and buttons that a trainee can operate during the simulation. However, because each aircraft has a different cockpit and creating multiple different physical simulated cockpits is relatively expensive, current simulators often simulate cockpits on display devices, including in some cases touchscreen display devices. Such simulators can present different trainees with different cockpits from different aircraft by merely changing the simulation software, and perhaps rearranging the location or orientation of one or more display devices.

During a simulation a trainee is typically presented with three-dimensional (3D) OTW that depicts a simulated environment outside the vehicle. The phrase "3D imagery" as used herein refers to images that are generated based on the intersection of a view frustum with a model of simulated parts. The simulated parts (sometimes referred to herein as model parts) are elements of the OTW environment, such as trees, buildings, clouds, terrain, and the like. Each model part is defined by polygons, and may have a renderable image associated with it. The 3D imagery may be made up of ones, tens, hundreds or thousands of model parts, and is rendered in real-time by one or more graphics processing units (GPUs) at a relatively rapid rate, such as 30, 60 or 120 images (i.e., frames) per second. The 3D OTW imagery changes in response to the movement and orientation of the vehicle.

Cockpit imagery, in contrast to the 3D OTW imagery, is conventionally two dimensional (2D) imagery that is not separately rendered each frame. One reason for this is that generating 3D cockpit imagery might involve rendering hundreds of flight instruments and controls 30, 60, or 120 frames per second would require a substantial amount of processing power, especially in conjunction with concurrently rendering 3D OTW imagery, and would require a substantial amount of processing power. Instead, an artist often generates predetermined cockpit images, and the simulator merely presents the same cockpit image each frame. The simulator may alter portions of the cockpit image based on actions of a pilot, such as showing a switch in an on position or an off position, but the cockpit image is not generated based on the current state of a plurality of cockpit model parts in a cockpit model of the cockpit.

In real life, as a vehicle moves about, shadows and reflections occur based on the position of a light source, such as the sun or a full moon, and thus the pilot sees the cockpit controls along with various reflections, shadows, glare and the like. 2D imagery cannot realistically depict reflections and shadows that continually change as the vehicle moves, and typically appears flat, without perspective, and without changing shadows, reflections and the like. An ability to generate 3D imagery of cockpits that include shadowing, reflections, glare and other real-life visual characteristics would increase the realism of the simulation.

The embodiments provide a simulation system that implements multiple 3D cockpit views. The embodiments generate realistic 3D cockpit views that include shadowing that changes depending on the orientation of the cockpit with respect to a light source, and flight controls with depth to create a more realistic and immersive training experience that more closely simulates the real-life cockpit being simulated.

Figure 1:
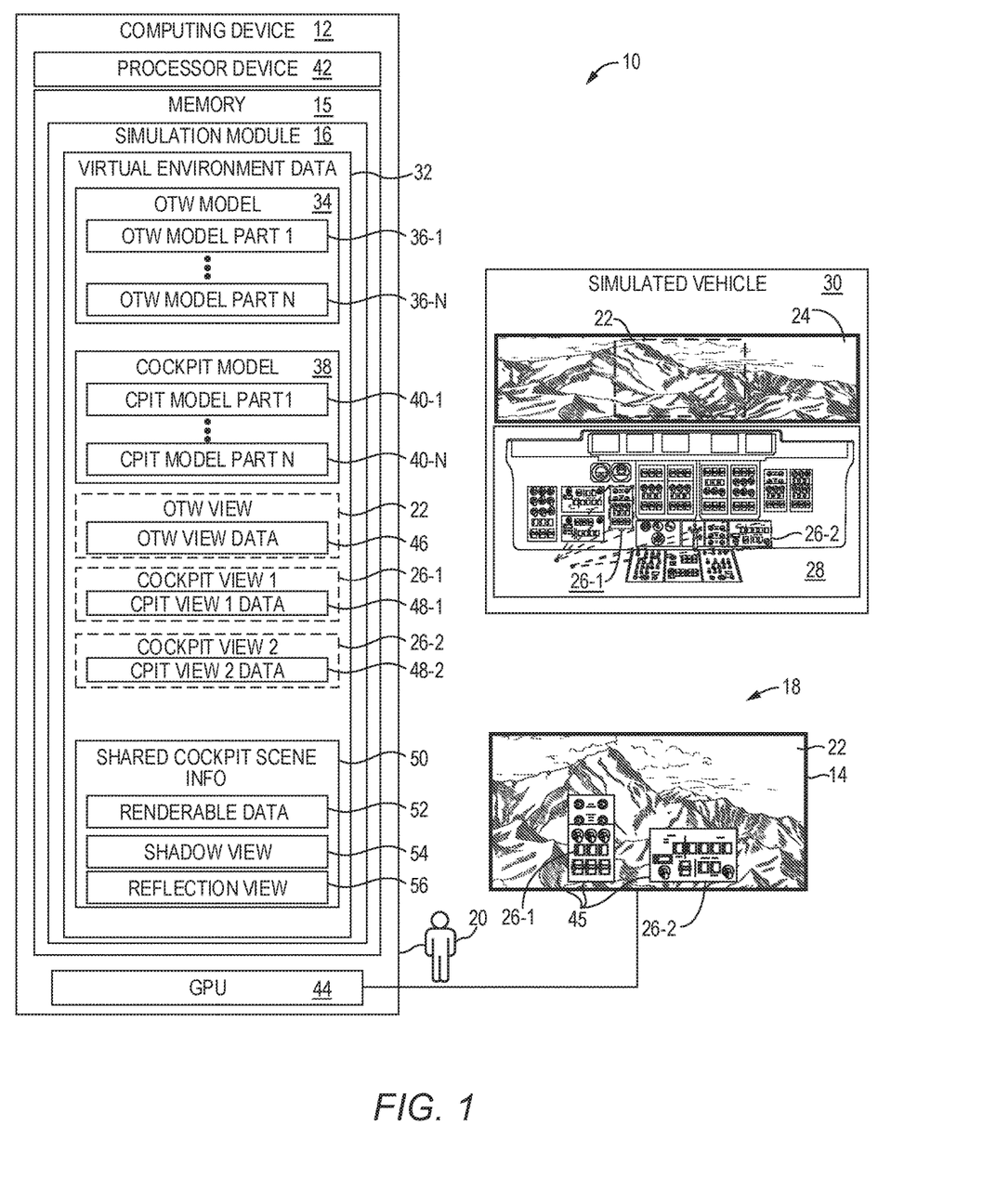
FIG. 1 is a block diagram of a simulation system according to one embodiment.

FIG. 1 is a block diagram of a simulation system 10 according to one embodiment. The simulation system 10 (sometimes referred to as a simulator) includes a computing device 12 that is communicatively coupled to one or more display devices 14. The display device 14 may be a separate device from the computing device 12, such as one or more monitors that are coupled to the computing device 12, or may be integrated with the computing device 12. The computing device 12 includes a memory 15 that includes a simulation module 16 which is configured to provide a simulation 18 to a user 20. The simulation 18 presents imagery based on an least one 3D out-the-window (OTW) view 22 of a simulation environment 24 and one or more 3D cockpit views 26-1, 26-2 of a cockpit 28 of a simulated vehicle 30.

The simulation 18 is generated based on virtual environment data 32 that includes, in this example, an OTW model 34 that contains real-time information and state information about each element (i.e., object) of the simulation environment 24 outside the simulated vehicle 30. The OTW model 34 includes a plurality of OTW model parts 36-1-36-N (generally, OTW model parts 36), each OTW model part 36 containing real-time information about a corresponding object in the simulation environment 24, including the spatial relationships of the objects, locations of the objects, attributes and characteristics of the objects, rendering information for generating imagery of the object, and the like. Any object in the simulation environment 24 may be represented by an OTW model part 36, such as, by way of non-limiting example, trees, animals, other vehicles, buildings, the sky, the sun, the moon, stars, clouds, terrain, and the like.

The virtual environment data 32 also includes a cockpit model 38 that contains real-time information and state information about each element (i.e., object) of the cockpit 28 of the simulated vehicle 30. The cockpit model 38 includes a plurality of cockpit model parts 40-1-40-N (generally, cockpit model parts 40), each cockpit model part 40 containing real-time information about a corresponding object in the cockpit 28, including the spatial relationships of the objects, locations of the objects, attributes and characteristics of the objects, rendering information for generating imagery of the object, and the like. Any object in the cockpit 28 may be represented by a cockpit model part 40, such as, by way of non-limiting example, switches, knobs, displays, gauges, structural dashboard elements, and any other controls or instruments that are to be simulated and rendered.

Aspects of the virtual environment data 32 may be continually updated during the simulation such that each OTW model part 36 and cockpit model part 40 reflects a current status of the object in the simulation. As will be discussed in greater detail herein, a processor device 42 interacts with a graphics processing unit (GPU) 44 to generate imagery 45 that is presented on the display device 14. In this example, the imagery 45 includes an OTW view image that depicts that portion of the environment 24 encompassed by the OTW view 22, and well as two cockpit view images overlaid on top of the OTW view image that depict those areas of the cockpit 28 encompassed by the cockpit views 26-1-26-2.

The generated imagery 45 is based on the OTW view 22 and the cockpit views 26-1-26-2. The OTW view 22 is defined by OTW view data 46, which includes information such as a location identifier (ID) that identifies a location within the simulation, a view direction ID that identifies a view direction in the virtual environment with respect to the location, a horizontal field-of-view (FOV) ID that identifies a horizontal FOV, and a vertical FOV ID that identifies a vertical FOV. The OTW view data 46 defines an OTW view frustum that intersects the OTW model 34, and the generated imagery 45 depicts that portion of the OTW model 34 intersected by the OTW view frustum defined by the OTW view data 46. As the user 20 moves the simulated vehicle 30 about the environment 24, the portion of the OTW model 34 that is intersected by the OTW view frustum defined by the OTW view data 46 continually changes, and thus the simulation module 16 iteratively, such as 30, 60, or 120 times a second (i.e., frames per second), intersects the OTW model 34 with the OTW view frustum defined by the OTW view data 46, determines which OTW model parts 36 are intersected by the OTW view frustum, and causes the GPU 44 to render a new OTW image and present the new OTW image on the display device 14.

The cockpit view 26-1 is defined by cockpit view data 48-1, which includes information such as a location ID that identifies a location within the simulation, a view direction ID that identifies a view direction in the virtual environment with respect to the location, a horizontal FOV ID that identifies a horizontal FOV, and a vertical FOV ID that identifies a vertical FOV. The cockpit view data 48-1 defines a cockpit view frustum that intersects the cockpit model 38, and the generated imagery 45 depicts that portion of the cockpit model 38 intersected by the cockpit view frustum defined by the cockpit view data 48-1. Unlike the OTW view 22, the portion of the cockpit 28 encompassed by the cockpit view frustum defined by the cockpit view data 48-1 may not change each iteration. In fact, this is one reason that conventional simulators typically do not use a cockpit model to render 3D views of a cockpit. However, because the simulation module 16 utilizes the cockpit model 38 and the cockpit view data 48-1 to iteratively render imagery of the cockpit view 26-1, visual characteristics of the cockpit 28 are realistically depicted, such as shadows, reflections, glare, and other lighting features, adding realism and immersion to the simulation.

Both the OTW view data 46 and the cockpit view data 48 may also include data that identifies a near clip value and a far clip value. Similarly, the cockpit view 26-2 is defined by cockpit view data 48-2, which includes information such as a location ID that identifies a location within the simulation, a view direction ID that identifies a view direction in the virtual environment with respect to the location, a horizontal FOV ID that identifies a horizontal FOV, and a vertical FOV ID that identifies a vertical FOV. The cockpit view data 48-2 defines a cockpit view frustum that intersects the cockpit model 38, and the generated imagery 45 depicts that portion of the cockpit model 38 intersected by the cockpit view frustum defined by the cockpit view data 48-2.

While, as noted above, the portions of the cockpit 28 encompassed by the cockpit views 26-1, 26-2 may not generally change, but under certain circumstances, they may change. In one situation, the simulation module 16, in conjunction with training the user 20, may alter the cockpit view data 48-1 dynamically to, for example, highlight a particular control or instrument based on an action of the user 20. For example, the simulation module 16 may determine that the user 20 has failed to operate a particular switch depicted in the cockpit view 26-1, and may then alter the cockpit view data 48-1 to zoom in on the particular switch, such as by altering the horizontal and/or vertical FOV so that only a particular flight instrument or control is encompassed by the cockpit view data 48-1. This technique can be used as a visual indicator to the user 20 that identifies the appropriate switch. The simulation module 16 may depict the zoomed in view for a period of time, such as 2, 5, or 10 seconds, and then restore the original cockpit view data 48-1 and thereafter present the imagery of that portion of the cockpit 28 previously depicted.

In another situation, as will be discussed in greater detail below, the user 20 or an operator, for example, may redefine the cockpit view data 48-1 to change the cockpit view 26-1 such that the cockpit view 26-1 subsequently encompasses a different portion of the cockpit 28. Moreover, as will be discussed in greater detail below, the user 20 or an operator, for example, may define an additional cockpit view, either prior to or during the simulation, such that three portions of the cockpit 28 are presented on the display device 14.

Each frame, the simulation module 16 determines a set of cockpit model parts 40 that are encompassed by the cockpit views 26-1, 26-2, and generates shared cockpit scene information 50, which contains only the set of cockpit model parts 40. The simulation module 16 updates aspects of only the set of cockpit model parts 40 as opposed to what may be hundreds or thousands of cockpit model parts 40 in the cockpit model 38. Thus, the knobs, switches, gauges, and other flight controls and instruments that are not depicted in the cockpit views 26-1, 26-2 may not be updated by the simulation module 16. For example, the simulation module 16 may only update or generate any renderable data 52, such as meshes, materials, textures, and scripts associated with the set of cockpit model parts 40. The simulation module 16 may also generate a single shadow view 54 that can be used by the GPU 44 to add appropriate shadowing to the imagery associated with both cockpit views 26-1, 26-2. The simulation module 16 may also generate one or more reflection views 56 that can be used by the GPU 44 to add appropriate reflections to the imagery associated with both cockpit views 26-1, 26-2. Note that in some situations the simulation module 16 need only generate a single shadow view 54 and a single reflection view 56 irrespective of the number of cockpit views 26. Similarly, the simulation module 16 need only update or generate a single set of renderable data 52 for a given cockpit model part 40, which can be shared by any number of cockpits views 26. Moreover, the simulation module 16 updates the renderable data 52 for only that set of cockpit model parts 40 that are encompassed by a cockpit view 26, thereby reducing the processing that would otherwise be used to update the renderable data for all cockpit model parts 40. The simulation module 16 can thereby generate not only one or more 3D OTW views 22 (one, in this example) but also concurrently generate multiple 3D cockpit views 26-1, 26-2, with only a single processor device 42, and in some embodiments, a single GPU 44, thereby implementing a full 3D simulation of both OTW imagery and cockpit imagery on a relatively inexpensive platform.

In some examples, a view may encompass both OTW model parts 36 and cockpit model parts 40. In such examples, the OTW view 22 may be rendered first. A depth buffer is then cleared. The view frustum may then be changed to use the near and far clip values associated with the cockpit view 26. In this manner, imagery associated with an OTW view 22 cannot be written on top of imagery associated with a cockpit view 26 because the depth buffer was cleared prior to rendering the imagery associated with the cockpit view 26 even though both views may have the same field of view. Objects, such as weapons or sensors that are attached to the aircraft would be included in the cockpit view 26. If these objects are detached or fired, they will be transitioned into the OTW view 22. The entire vehicle and any attachments may be included in the cockpit view 26. In a more advanced example, cockpit model parts 40 may be divided into transparent parts such as windows, and opaque parts, such as controls on a cockpit dashboard. The opaque cockpit model parts 40 can be drawn first, writing to a stencil buffer. Then the OTW view 22 is drawn using the stencil to skip any image portions that are occluded by the opaque cockpit model parts 40. Finally transparent cockpit model parts 40 are drawn.

It should be noted that because the simulation module 16 is a component of the computing device 12, functionality implemented by the simulation module 16 may be attributed to the computing device 12 generally. Moreover, in examples where the simulation module 16 comprises software instructions that program the processor device 42 to carry out functionality discussed herein, functionality implemented by the simulation module 16 may be attributed herein to the processor device 42.

Figure 2:
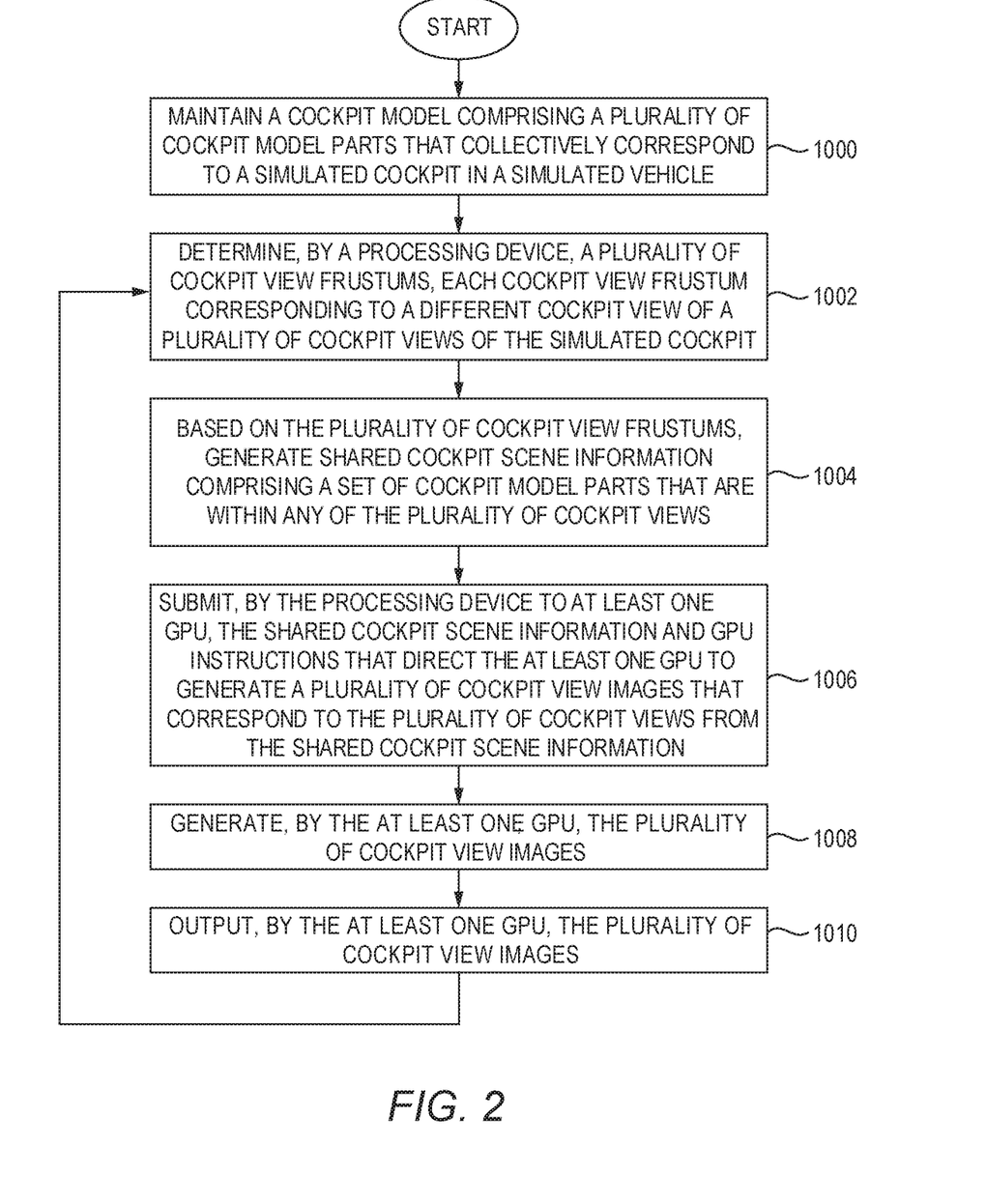
FIG. 2 is a flowchart of a method for rendering multiple three-dimensional (3D) cockpit views in realtime according to one embodiment.

FIG. 2 is a flowchart of a method for rendering multiple 3D cockpit views in realtime, according to one embodiment. The processor device 42 maintains the cockpit model 38 comprising the plurality of cockpit model parts 40 that collectively correspond to the simulated cockpit 28 in the simulated vehicle 30 (FIG. 2, block 1000). The processor device 42, for each frame of a plurality of frames, determines a plurality of cockpit view frustums, each cockpit view frustum corresponding to a different cockpit view 26 of a plurality of cockpit views 26 of the simulated cockpit 28 (FIG. 2, block 1002). The processor device 42, for each frame of the plurality of frames, based on the plurality of cockpit view frustums, generates the shared cockpit scene information 50 comprising a set of cockpit model parts 40 that are within any of the plurality of cockpit views 26 (FIG. 2, block 1004). The processor device 42, for each frame of the plurality of frames, submits to the at least one GPU 44, the shared cockpit scene information 50 and GPU instructions that direct the at least one GPU 44 to generate a plurality of cockpit view images that correspond to the plurality of cockpit views 26 from the shared cockpit scene information 50 (FIG. 2, block 1006). The processor device 42, for each frame of the plurality of frames, generates, by the at least one GPU 44, the plurality of cockpit view images (FIG. 2, block 1008). The at least one GPU 44 outputs the plurality of cockpit view images to the display device 14 (FIG. 2, block 1010). Blocks 1002-1010 are repeated iteratively throughout the simulation, such as at a rate of 30, 60, 120 or more frames per second.

Figure 3:
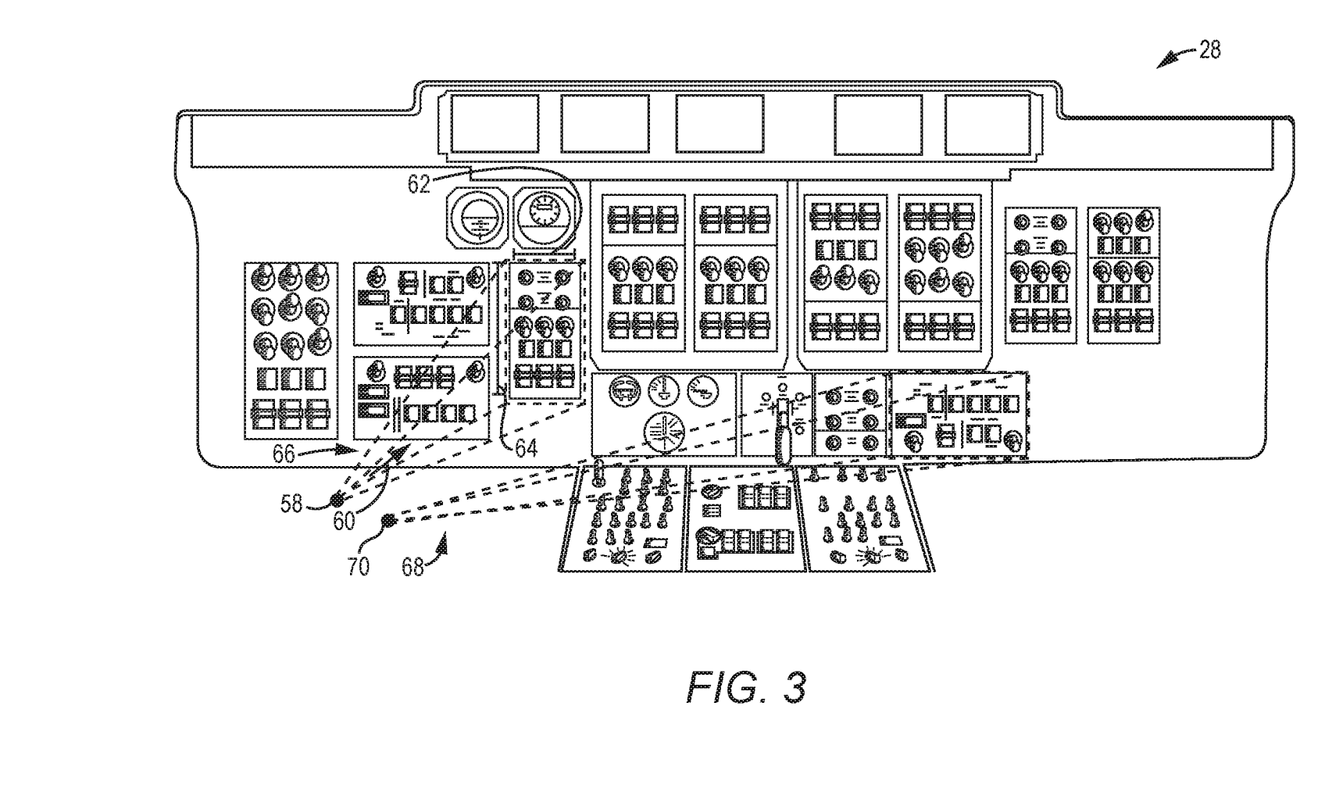
FIG. 3 is a diagram illustrating cockpit view frustums that correspond with cockpit views of a simulated cockpit according to one embodiment.

FIG. 3 is a diagram illustrating cockpit view frustums that correspond with cockpit views 26-1, 26-2 of the cockpit 28 according to one embodiment. The cockpit view data 48-1 includes a location ID that identifies a view origination location 58 of the cockpit view 26-1. The location 58 may correspond, for example, with a predetermined location of a head of the user 20, for example. The cockpit view data 48-1 also includes a view direction ID that identifies a direction 60 of the cockpit view 26-1. The cockpit view data 48-1 includes a horizontal FOV ID that identifies a horizontal FOV 62 of the cockpit view 26-1. The cockpit view data 48-1 includes a vertical FOV ID that identifies a vertical FOV 64 of the cockpit view 26-1. Each frame, based on the cockpit view data 48-1, a cockpit view frustum 66 is determined, and the intersection of the cockpit view frustum 66 on the cockpit 28 identifies those cockpit model parts 40 that will be updated and rendered to generate imagery for the cockpit view 26-1. Note that the GPU 44 will render the imagery based on the cockpit view frustum 66, such that the controls and instruments within the cockpit view 26-1 are drawn with a perspective view originating at the location 58.

The cockpit view data 48-2 contains information similar to that discussed above with regard to the cockpit view data 48-1, but defines a cockpit view frustum 68 that originates at a view origination location 70. Each frame, based on the cockpit view data 48-2, the cockpit view frustum 68 is determined, and the intersection of the cockpit view frustum 68 on the cockpit 28 identifies those cockpit model parts 40 that will be updated and rendered to generate imagery for the cockpit view 26-2 concurrently with the generation of the imagery for the cockpit view 26-1. Again, note that the GPU 44 will render the imagery based on the cockpit view frustum 68, such that the controls and instruments within the cockpit view 26-2 are drawn with a perspective view originating at the location 70.

Figure 4:
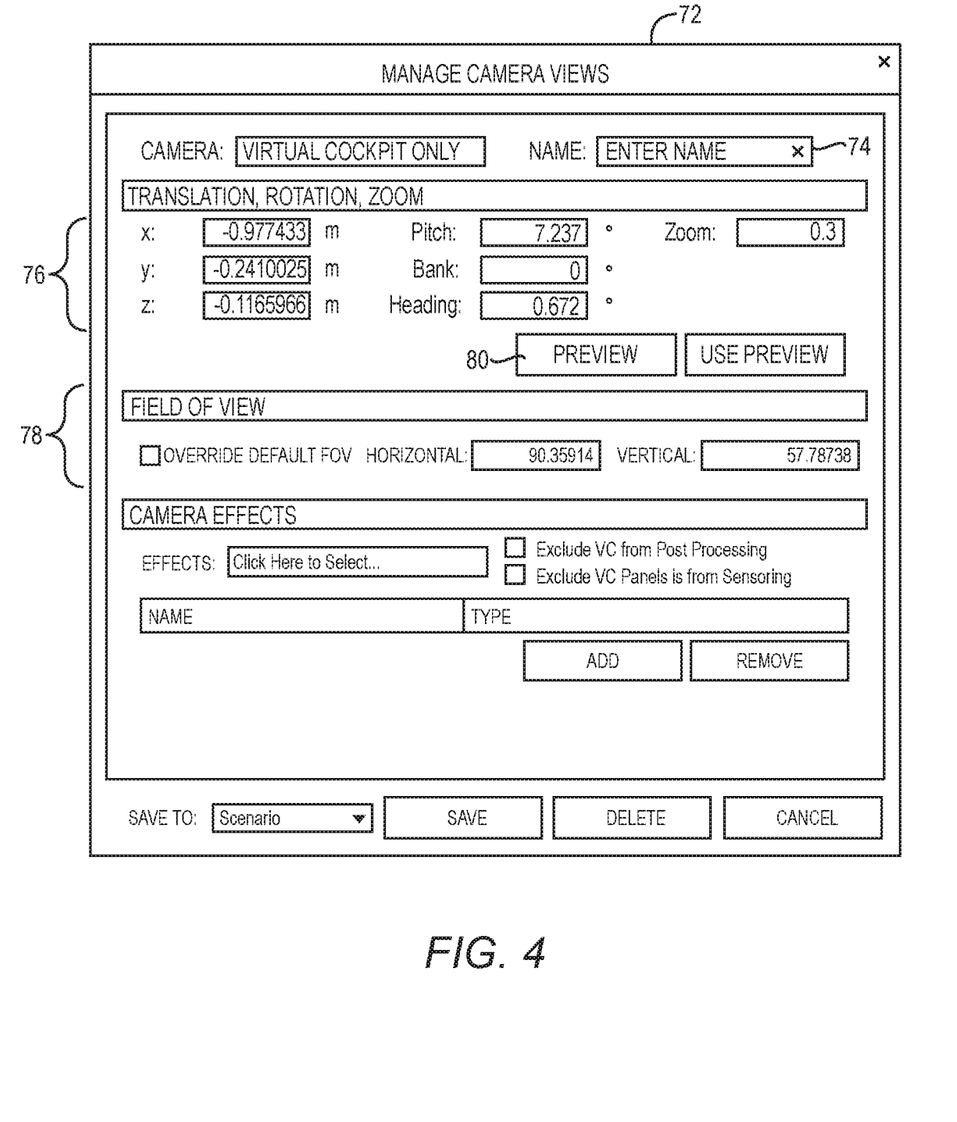
FIG. 4 illustrates a cockpit view input window that facilitates the entry of cockpit view information by a user to redefine an existing cockpit view, or generate a new cockpit view according to one embodiment.

The simulation module 16 allows the user 20 to redefine a cockpit view 26 or generate a new cockpit view 26. In this regard, FIG. 4 illustrates a cockpit view input window 72 that facilitates the entry of cockpit view information by the user 20 to redefine an existing cockpit view 26, or generate a new cockpit view 26 according to one embodiment. The cockpit view input window 72 includes a name control 74 that allows the user 20 to call up an existing cockpit view 26 or provide a name of a new cockpit view 26. Orientation controls 76 allow the user 20 to identify an origination location of the cockpit view (X, Y and Z), pitch, bank, and heading orientations, and a zoom factor. FOV controls 78 allow the user 20 to define horizontal and vertical fields of view. A preview control 80, when selected, generates a window on the display device 14 that shows that portion of the cockpit 28 encompassed by the cockpit view 26 defined by the cockpit view input window 72. Once satisfied with the new cockpit view 26, the user 20 can save the cockpit view 26. The process of redefining or generating a cockpit view 26 can occur prior to the initiation of the simulation, or during the simulation. The dialog box thus allows the user 20 to easily and intuitively redefine an existing cockpit view 26, or generate a new cockpit view 26 that encompasses any portion of the cockpit 28. The new cockpit view 26 can be saved to a configuration file for later reuse in any other scenario or simulation.

After the generation of the new cockpit view 26, the simulation module 16, each frame, then defines a new cockpit view frustum, determines those cockpit model parts 40 encompassed by the new cockpit view frustum, includes those cockpit model parts 40 into the shared cockpit scene information 50, and causes the GPU 44 to generate and display a new cockpit view image on the display device 14. If the cockpit view 26 redefined a previous cockpit view 26, the simulation module 16 follows the same process, but no longer generates cockpit view imagery associated with the previous cockpit view 26.

Figure 5:
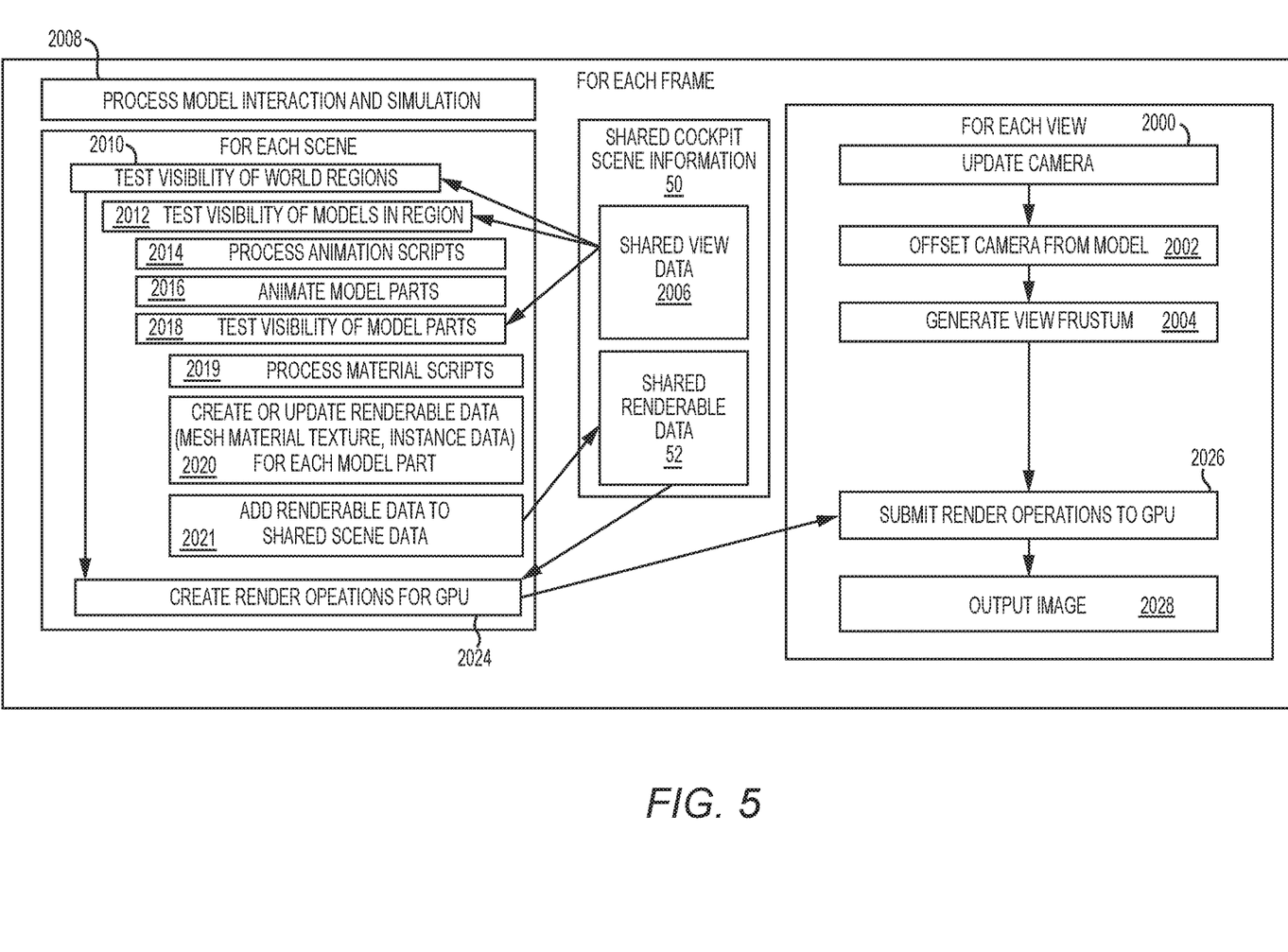
FIG. 5 is a block diagram illustrating cockpit model processing associated with generating cockpit view images for a single frame according to one embodiment.

FIG. 5 is a block diagram illustrating cockpit model processing associated with generating cockpit view images for a single frame according to one embodiment. At block 2000, and for each OTW view 22 and cockpit view view 26, the simulation will update any camera or view parameters that may change over time as a result of, for example, the simulated passage of time or user input. For example, a camera could be panning based on user input from a joystick or head tracking device. In this case, the orientation relative to the camera's origin is changing each simulated frame. At block 2002, the origination point (sometimes referred to as camera location) of each cockpit view frustum associated with each cockpit view data 48 and each OTW view frustum associated with each OTW view data 46 is determined. This may be done by applying transformations to account for position and orientation offsets for some number of relative reference frames. For example, a camera could represent a person's eye, which is relative to a head position, which is relative to an aircraft position, which is relative to an aircraft carrier, which is relative to the world. The final origin point generated may be world-relative. Using world-relative location data for all objects and view locations may be useful because this allows location data to be used in any view. At block 2006, the cockpit view frustum for each cockpit view 26 is generated based on the corresponding cockpit view data 48 and the determined origination point, and each OTW view frustum for each OTW view 22 is generated based on the OTW view data 46 and the origination point. The cockpit model parts 40 and OTW model parts 36 define the model parts in a shared view data 2006.

At block 2008, object locations and simulation states are determined using data from the simulation. For example, the simulation may adjust the location of simulated objects based on the distance traveled since the last simulation frame. As another example, simulated objects may have been damaged or destroyed since the previous simulation frame. At block 2010, based on the shared view data 2006, it is determined which world regions of a plurality of different world regions are encompassed by the shared view data 2006. The world regions may be divided into various models. At block 2012, the models within the world regions encompassed by the shared view data 2006 are tested for visibility based on the shared view data 2006. At block 2014, animation scripts are processed for those model parts contained in the models that are visible based on the shared view data 2006. For example, a script could set the rotation of a compass needle, based on a simulated heading of an aircraft determined in block 2008. At block 2016 any model parts in such models are animated. For example, in response to user input, a switch may be moved or a knob rotated. At block 2018, it is determined which model parts are encompassed by the shared view data 2006.

At block 2019, material scripts are processed for those model parts encompassed by the shared view data 2006. Examples of material scripts include, for example, blending between day and night textures, and swapping texture to indicate damage. Additional examples may include adjusting brightness settings in a cockpit multi-function display, or changing the color of a status indicator light from green to red to indicate a failure. At block 2020, renderables associated with cockpit model parts 40 encompassed by the shared view data 2006 are created or updated. At block 2021, renderable data associated with the cockpit model parts 40 encompassed by the shared view data 2006 are added as shared renderable data 52 to the shared cockpit scene information 50. At block 2024, render operations are generated for the GPU 44. At block 2026, the list of GPU instructions and the shared cockpit scene information 50 are provided to the GPU 44. At block 2026, the GPU 44, based on the list of GPU instructions and the shared cockpit scene information 50, generates and outputs cockpit view images that correspond to each cockpit view 26.

Figure 6A:
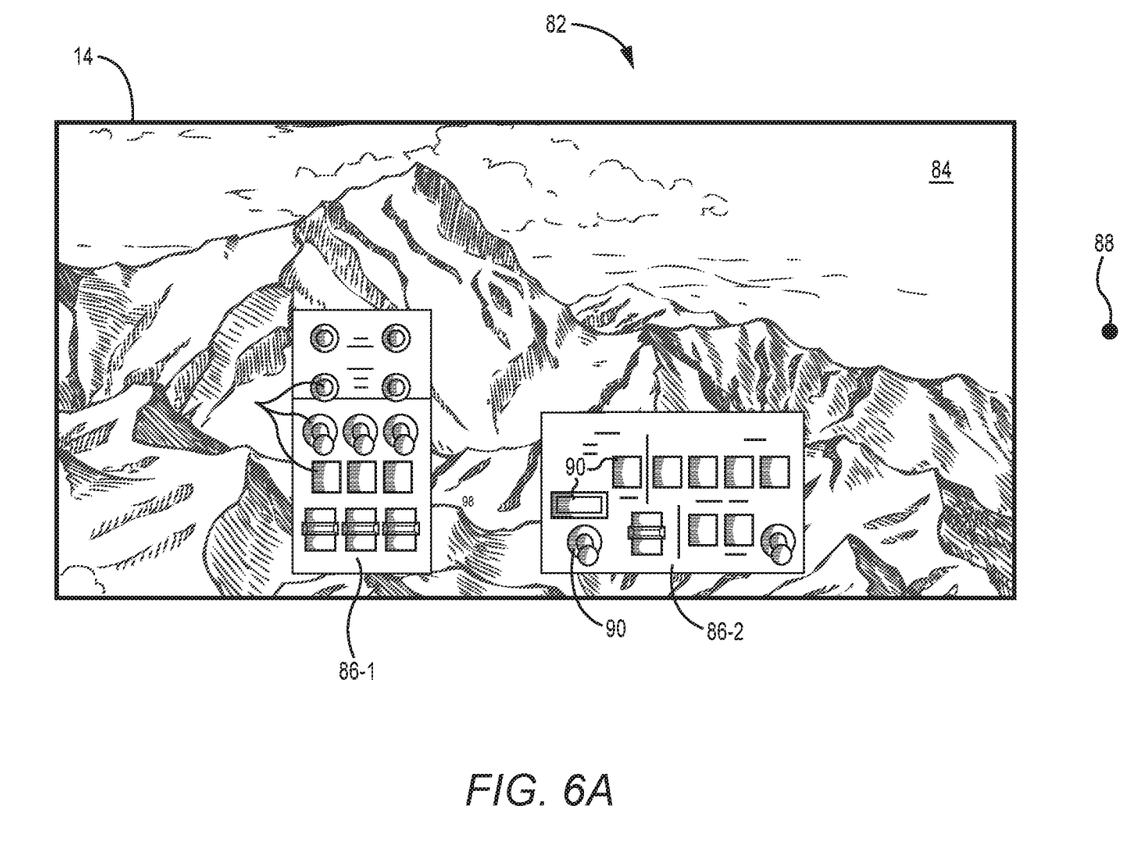
FIGS. 6A and 6B illustrate aspects of 3D cockpit view images that may be presented to a user according to one embodiment.
Figure 6B:
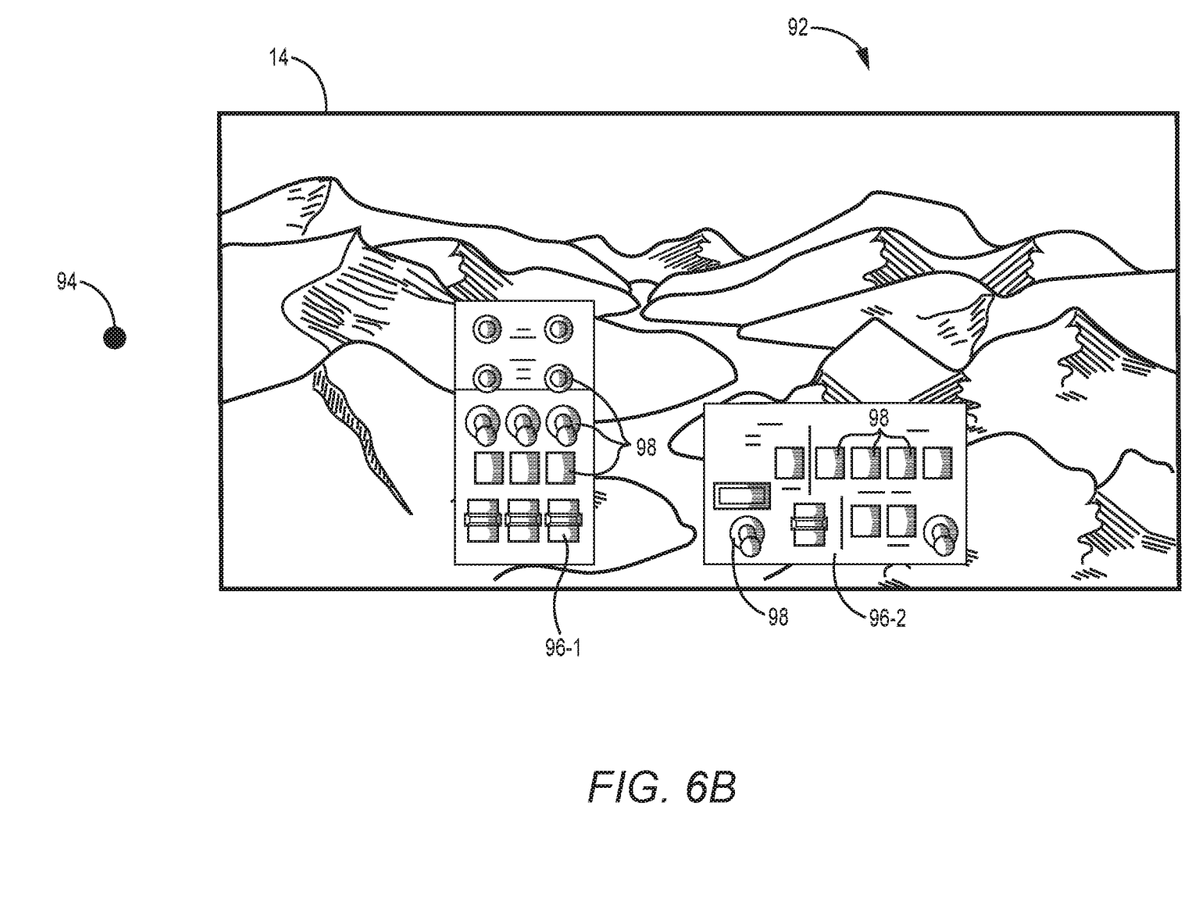

FIGS. 6A and 6B illustrate aspects of 3D cockpit view images that may be presented to the user 20 according to one embodiment. FIG. 6A depicts an image 82 that includes an OTW image 84 and two cockpit images 86-1 and 86-2 that is displayed on the display device 14 at a first point in time. At this orientation of the simulation vehicle, a light source, in particular the sun, is located generally at a location 88. The simulation module 16, in conjunction with the GPU 44, generates a single shadow view based on the sun being at the location 88, and this single shadow view is used by the GPU 44 to render the cockpit images 86-1 and 86-2 to include shadow features 90.

FIG. 6B depicts an image 92 presented on the display device 14 at a subsequent point in time after the simulated vehicle 30, an airplane in this example, has altered its direction of travel such that the sun is now at a location 94 with respect to the airplane. The simulation module 16, in conjunction with the GPU 44, generates a single shadow view based on the sun being at the location 94, and this single shadow view is used by the GPU 44 to render cockpit view images 96-1 and 96-2 to include shadow features 98. Note that the shadow features 98 are in different locations than the shadow features 90 illustrated in FIG. 6A due to the real-time dynamic 3D rendering of the cockpit view images 96-1, 96-2.

Figure 7:
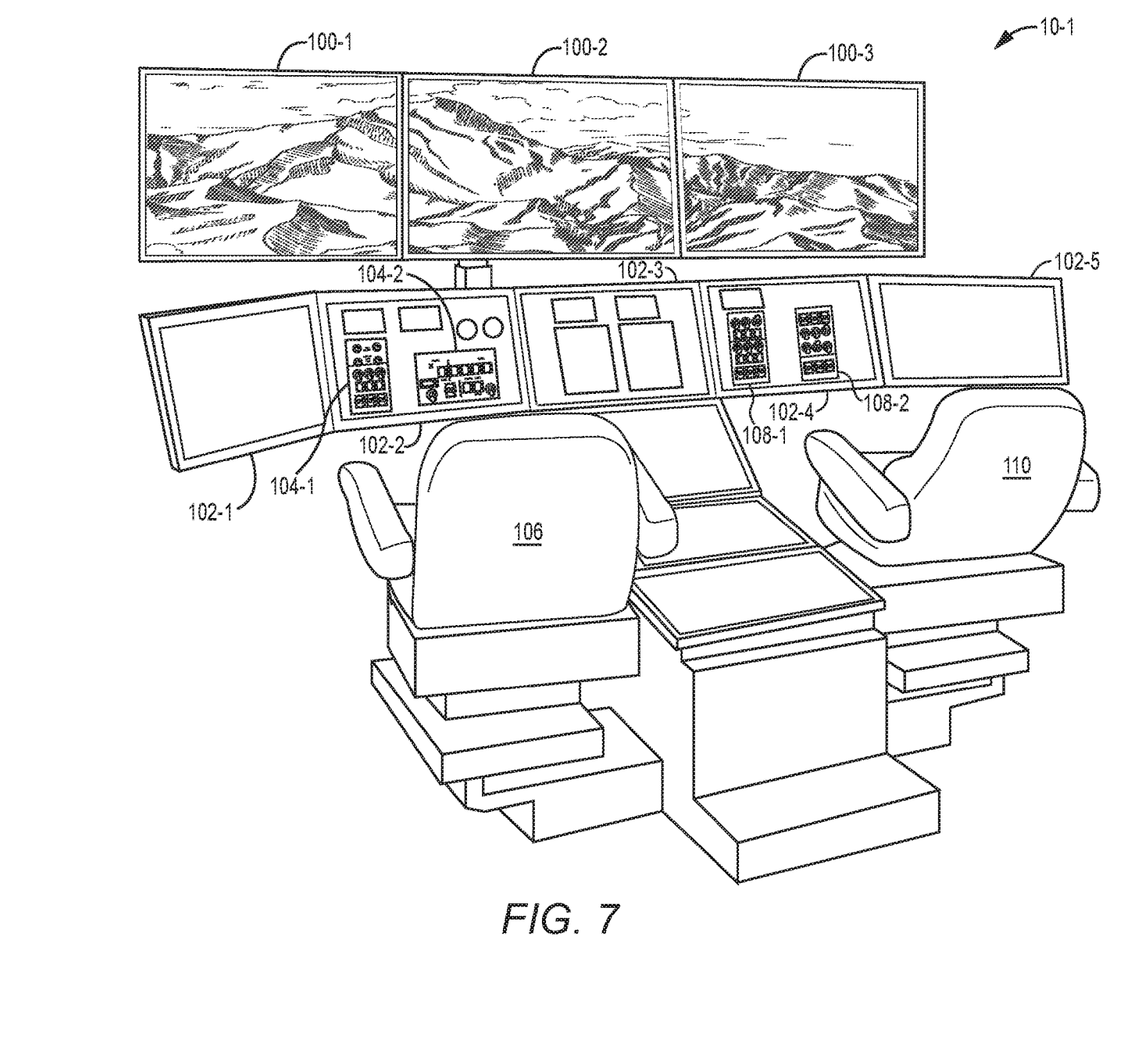
FIG. 7 is a diagram of a simulation system according to another embodiment.

FIG. 7 is a diagram of a simulation system 10-1 according to another embodiment. The simulation system 10-1 operates substantially similarly to the simulation system 10 described above, however, the simulation system 10-1 contains a plurality of OTW display panels 100-1-100-3 on which OTW view images are displayed during a simulation. The simulation system 10-1 also includes a plurality of cockpit display panels 102-1-102-5 on which cockpit view images can be displayed. In this example, the cockpit display panel 102-2 has two cockpit view images 104-1, 104-2. The cockpit view images 104-1 and 104-2 have corresponding cockpit view data 48 that defines corresponding cockpit view frustums originating from a location of a user's head seated in a seat 106 so that the cockpit view images 104-1, 104-2 have realistic 3D imagery of cockpit controls and instruments from the perspective of a pilot trainee sitting in the seat 106.

The cockpit display panel 102-4 has two cockpit view images 108-1, 108-2. The cockpit view images 108-1 and 108-2 have corresponding cockpit view data 48 that defines corresponding cockpit view frustums originating from a location of a user's head seated in a seat 110 so that the cockpit view images 108-1, 108-2 have realistic 3D imagery of cockpit controls and instruments from the perspective of a co-pilot trainee sitting in the seat 110. During the simulation, additional cockpit views 26 may be defined and presented by the simulation module 16 on, for example, the cockpit display panel 102-3.

Figure 8:
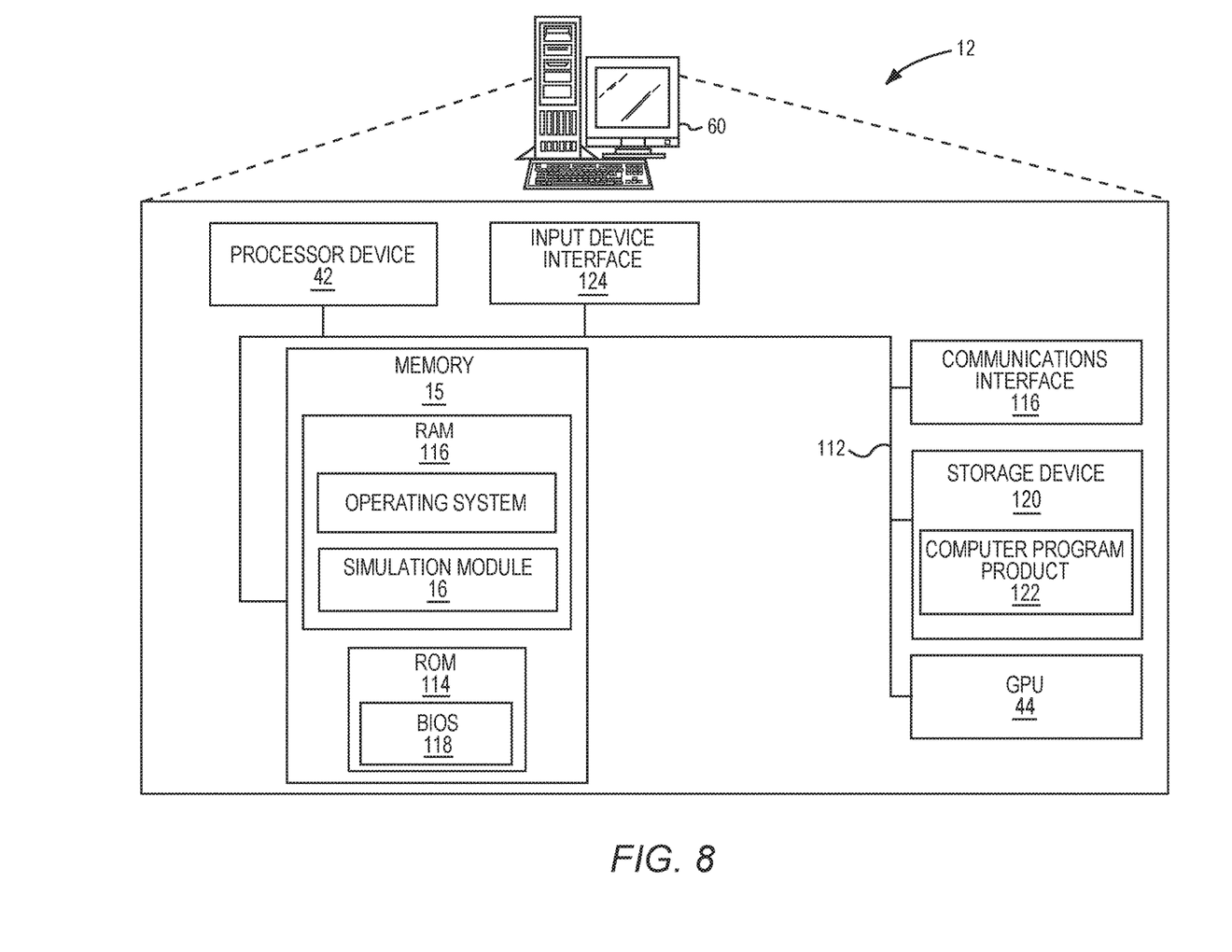
FIG. 8 is a block diagram of a computing device suitable for implementing examples according to one example.

FIG. 8 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 42, the memory 15, the GPU 44, and a system bus 112. The system bus 112 provides an interface for system components including, but not limited to, the system memory 15 and the processor device 42. The processor device 42 can be any commercially available or proprietary processor device.

The system bus 112 may be any of several types of bus structures that may further interconnect to a memory bus (with or without a memory controller), a peripheral bus, and/or a local bus using any of a variety of commercially available bus architectures. The system memory 15 may include non-volatile memory 114 (e.g., read-only memory (ROM), erasable programmable read-only memory (EPROM), electrically erasable programmable read-only memory (EEPROM), etc.), and volatile memory 116 (e.g., random-access memory (RAM)). A basic input/output system (BIOS) 118 may be stored in the non-volatile memory 114 and can include the basic routines that help to transfer information between elements within the computing device 12. The volatile memory 116 may also include a high-speed RAM, such as static RAM, for caching data.

The computing device 12 may further include or be coupled to a non-transitory computer-readable storage medium such as a storage device 120, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 120 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 120 and in the volatile memory 116, including an operating system and one or more program modules, such as the simulation module 16, which may implement the functionality described herein in whole or in part.

All or a portion of the examples may be implemented as a computer program product 122 stored on a transitory or non-transitory computer-usable or computer-readable storage medium, such as the storage device 120, which includes complex programming instructions, such as complex computer-readable program code, to cause the processor device 42 to carry out the steps described herein. Thus, the computer-readable program code can comprise software instructions for implementing the functionality of the examples described herein when executed on the processor device 42. The processor device 42, in conjunction with the simulation module 16 in the volatile memory 116, may serve as a controller, or control system, for the computing device 12 that is to implement the functionality described herein.

An operator, such as the user 20, may also be able to enter one or more configuration commands through a keyboard (not illustrated) or a pointing device such as a mouse (not illustrated). Such input devices may be connected to the processor device 42 through an input device interface 124 that is coupled to the system bus 112 but can be connected by other interfaces such as a parallel port, an Institute of Electrical and Electronic Engineers (IEEE) 1394 serial port, a Universal Serial Bus (USB) port, an IR interface, and the like.

The computing device 12 may also include a communications interface 126 suitable for communicating with a network as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   maintaining, by a computing device comprising a processing device and at least one graphics processing unit (GPU), during a simulation, a cockpit model comprising a plurality of cockpit model parts that collectively correspond to a simulated cockpit in a simulated vehicle; and
   for each frame of a plurality of frames:
     determining, by the processing device, a plurality of cockpit view frustums, each cockpit view frustum corresponding to a different cockpit view of a plurality of cockpit views of the simulated cockpit;
     based on the plurality of cockpit view frustums, generating shared cockpit scene information comprising a set of cockpit model parts that are within any of the plurality of cockpit views;
     submitting, by the processing device to the at least one GPU, the shared cockpit scene information and GPU instructions that direct the at least one GPU to generate a plurality of cockpit view images that correspond to the plurality of cockpit views from the shared cockpit scene information; and
     generating, by the at least one GPU, the plurality of cockpit view images.

2. The method of claim 1 further comprising:
   determining, for only for those cockpit model parts in the set of cockpit model parts, whether renderables associated with the set of cockpit model parts are to be updated; and
   updating only the renderables associated with the set of cockpit model parts.

3. The method of claim 1 further comprising presenting, on a same display device, the plurality of cockpit view images.

4. The method of claim 1 further comprising presenting, on a plurality of different display devices, the plurality of cockpit view images.

5. The method of claim 1 wherein generating the shared cockpit scene information comprising the set of cockpit model parts further comprises:
   generating a shadow view that identifies shadowing across the set of cockpit model parts; and
   submitting, by the processing device to the at least one GPU, the shadow view with the shared cockpit scene information, the plurality of cockpit view frustums, and the GPU instructions.

6. The method of claim 1 further comprising:
   maintaining an out-the-window (OTW) model comprising a plurality of OTW model parts that collectively correspond to a simulated environment outside of the simulated vehicle; and
   for each frame of the plurality of frames:
     determining an OTW view frustum that corresponds to an OTW view of the simulated environment;
     based on the OTW view frustum, identifying a set of OTW model parts that comprise OTW model parts that are within the OTW view;
     directing the at least one GPU, by the processing device, to generate an OTW view image based on the OTW view frustum; and
     generating, by the at least one GPU, the OTW view image.

7. The method of claim 6 further comprising:
   presenting the OTW view image on a display device; and
   presenting at least one of the plurality of cockpit view images on top of the OTW view image on the display device.

8. The method of claim 7 wherein the computing device has only one general purpose processing device.

9. The method of claim 1 comprising:
   presenting, on a display device, a cockpit view input window;
   receiving cockpit view information via the cockpit view input window that identifies a new cockpit view;
   defining, based on the cockpit view information a new cockpit view frustum;

generating, based on the new cockpit view frustum, a new cockpit view image; and presenting, on the display device, the new cockpit view image.

10. The method of claim 9 wherein presenting the cockpit view input window comprises presenting the cockpit view input window during the simulation.

11. The method of claim 1 comprising:
presenting, on a display device, a cockpit view input window that contains cockpit view information associated with a first cockpit view of the plurality of cockpit views, the first cockpit view encompassing a first region of the simulated cockpit;
receiving updated cockpit view information via the cockpit view input window that alters the first cockpit view to encompass a second region of the simulated cockpit; and
in subsequent frames of the plurality of frames, generating cockpit view images that encompass the second region and not generating cockpit view images that encompass the first region.

12. The method of claim 1 wherein at least one cockpit model part corresponds to a switch of the simulated cockpit and at least one cockpit model part corresponds to a dial of the simulated cockpit.

13. A computing device comprising:
a memory;
a graphics processing unit (GPU); and
a processor device coupled to the memory and the GPU that is configured to:
maintain, during a simulation, a cockpit model comprising a plurality of cockpit model parts that collectively correspond to a simulated cockpit in a simulated vehicle; and
for each frame of a plurality of frames:
determine a plurality of cockpit view frustums, each cockpit view frustum corresponding to a different cockpit view of a plurality of cockpit views of the simulated cockpit;
based on the plurality of cockpit view frustums, generate shared cockpit scene information comprising a set of cockpit model parts that are within any of the plurality of cockpit views;
submit, to the GPU, the shared cockpit scene information and GPU instructions that direct the GPU to generate a plurality of cockpit view images that correspond to the plurality of cockpit views from the shared cockpit scene information; and
generate, by the GPU, the plurality of cockpit view images.

14. The computing device of claim 13 wherein the processor device is further configured to:
determine, for only for those cockpit model parts in the set of cockpit model parts, whether renderables associated with the set of cockpit model parts are to be updated; and
update only the renderables associated with the set of cockpit model parts.

15. The computing device of claim 13 wherein to generate the shared cockpit scene information comprising the set of cockpit model parts, the processor device is further configured to:
generate a shadow view that identifies shadowing across the set of cockpit model parts; and
submit, to the GPU, the shadow view with the shared cockpit scene information, the plurality of cockpit view frustums, and the GPU instructions.

16. The computing device of claim 13, wherein the processor device is further configured to:
maintain an out-the-window (OTW) model comprising a plurality of OTW model parts that collectively correspond to a simulated environment outside of the simulated vehicle; and
for each frame of the plurality of frames:
determine an OTW view frustum that corresponds to an OTW view of the simulated environment;
based on the OTW view frustum, identify a set of OTW model parts that comprise OTW model parts that are within the OTW view;
direct the GPU to generate an OTW view image based on the OTW view frustum; and
generate, by the GPU, the OTW view image.

17. A computer program product stored on a non-transitory computer-readable storage medium and including instructions configured to cause a processor device to:
maintain a cockpit model comprising a plurality of cockpit model parts that collectively correspond to a simulated cockpit in a simulated vehicle; and
for each frame of a plurality of frames:
determine a plurality of cockpit view frustums, each cockpit view frustum corresponding to a different cockpit view of a plurality of cockpit views of the simulated cockpit;
based on the plurality of cockpit view frustums, generate shared cockpit scene information comprising a set of cockpit model parts that are within any of the plurality of cockpit views;
submit, to a graphics processing unit (GPU), the shared cockpit scene information and GPU instructions that direct the GPU to generate a plurality of cockpit view images that correspond to the plurality of cockpit views from the shared cockpit scene information; and
generate, by the GPU, the plurality of cockpit view images.

18. The computer program product of claim 17 wherein the instructions further cause the processor device to:
determine, for only for those cockpit model parts in the set of cockpit model parts, whether renderables associated with the set of cockpit model parts are to be updated; and
update only the renderables associated with the set of cockpit model parts.

19. The computer program product of claim 17 wherein to generate the shared cockpit scene information comprising the set of cockpit model parts, the instructions further cause the processor device to:
generate a shadow view that identifies shadowing across the set of cockpit model parts; and
submit, to the GPU, the shadow view with the shared cockpit scene information, the plurality of cockpit view frustums, and the GPU instructions.

20. The computer program product of claim 17, wherein the instructions further cause the processor device to:
maintain an out-the-window (OTW) model comprising a plurality of OTW model parts that collectively correspond to a simulated environment outside of the simulated vehicle; and
for each frame of the plurality of frames:
determine an OTW view frustum that corresponds to an OTW view of the simulated environment;
based on the OTW view frustum, identify a set of OTW model parts that comprise OTW model parts that are within the OTW view;

direct the GPU to generate an OTW view image based on the OTW view frustum; and
generate, by the GPU, the OTW view image.

* * * * *